United States Patent
Yamanaka et al.

(10) Patent No.: US 11,027,651 B2
(45) Date of Patent: Jun. 8, 2021

(54) VEHICLE CONTROL DEVICE, VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Hiroshi Yamanaka, Wako (JP); Yasushi Shoda, Wako (JP); Junpei Noguchi, Wako (JP); Yuki Hara, Wako (JP); Katsuyasu Yamane, Wako (JP); Yoshitaka Mimura, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/785,676

(22) Filed: Feb. 10, 2020

(65) Prior Publication Data

US 2020/0269756 A1 Aug. 27, 2020

(30) Foreign Application Priority Data

Feb. 27, 2019 (JP) .............................. JP2019-034303

(51) Int. Cl.
*B60Q 1/22* (2006.01)
*B60Q 9/00* (2006.01)
(Continued)

(52) U.S. Cl.
CPC ............ *B60Q 9/00* (2013.01); *G05D 1/0223* (2013.01); *G05D 1/0246* (2013.01);
(Continued)

(58) Field of Classification Search
CPC ............... B60Q 9/00; G05D 1/0223; G05D 2201/0213; G05D 1/0246; G05D 1/0088; G06K 9/00805; H04W 4/40
See application file for complete search history.

(56) References Cited

U.S. PATENT DOCUMENTS 10,628,641 B2 * 4/2020 Knotts ............... G06K 7/10297
10,740,863 B2 * 8/2020 Iagnemma ........... G05D 1/0027
(Continued)

FOREIGN PATENT DOCUMENTS

JP 2017-126133 7/2017

*Primary Examiner* — Toan N Pham
(74) *Attorney, Agent, or Firm* — Amin, Turocy & Watson LLP

(57) ABSTRACT

A vehicle control device includes: a recognizer configured to recognize a surrounding environment of a vehicle; a driving controller configured to perform speed control and steering control of the vehicle based on a recognition result of the recognizer; a communication unit configured to communicate with a terminal device of a user boarding the vehicle; a vehicle exterior notification unit configured to notify information regarding vehicle identification to the vehicle exterior; and a notification controller configured to cause the communication unit to transmit information for notifying the information regarding the vehicle identification to the terminal device and to cause the vehicle exterior notification unit to notify the information regarding the vehicle identification when the driving controller causes the vehicle to travel toward a position at which the user is located.

11 Claims, 8 Drawing Sheets

(51) Int. Cl.
  *G05D 1/02* (2020.01)
  *G06K 9/00* (2006.01)
  *H04W 4/40* (2018.01)
(52) U.S. Cl.
  CPC .......... *G06K 9/00805* (2013.01); *H04W 4/40* (2018.02); *G05D 2201/0213* (2013.01)

(56) References Cited

U.S. PATENT DOCUMENTS

2019/0118802 A1* 4/2019 Sakuma ................. G08G 1/146
2019/0243368 A1* 8/2019 Seki ................ B60W 60/00253

* cited by examiner

194

| IMAGE SETTING INFORMATION | | SOUND SETTING INFORMATION | | ... |
|---|---|---|---|---|
| TYPE OF IMAGE | DISPLAY MODE | TYPE OF SOUND | OUTPUT MODE | |
| RED | BLINKING LEVEL 3 | Music004 | VOLUME LEVEL 5 | ... |

VEHICLE CONTROL DEVICE, VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2019-034303, filed Feb. 27, 2019, the content of which is incorporated herein by reference.

BACKGROUND

Field of the Invention

The present invention relates to a vehicle control device, a vehicle control system, a vehicle control method, and a storage medium.

Description of Related Art

In recent years, studies of automated vehicle control have been conducted. With regard to the studies, a technology for moving a vehicle to the position of a user through automated driving when a camera image captured by a camera is compared with a user image related to the user of the vehicle and presence of the user is recognized from the camera image is known (see Japanese Unexamined Patent Application, First Publication No. 2017-126133).

SUMMARY

In the technology of the related art, a user may not be aware of which vehicle to board in some cases.

An aspect of the present invention is devised in view of such circumstances and an objective of the present invention is to provide a vehicle control device, a vehicle control system, a vehicle control method, and a storage medium capable of allowing a user to be aware of a vehicle that the user will board more clearly.

A vehicle control device, a vehicle control system, a vehicle control method, and a storage medium according to the present invention adopt the following configurations.

(1) According to an aspect of the present invention, a vehicle control device includes: a recognizer configured to recognize a surrounding environment of a vehicle; a driving controller configured to perform speed control and steering control of the vehicle based on a recognition result of the recognizer; a communication unit configured to communicate with a terminal device of a user boarding the vehicle; a vehicle exterior notification unit configured to notify information regarding vehicle identification to the vehicle exterior; and a notification controller configured to cause the communication unit to transmit information for notifying the information regarding the vehicle identification to the terminal device and to cause the vehicle exterior notification unit to notify the information regarding the vehicle identification when the driving controller causes the vehicle to travel toward a position at which the user is located.

(2) In the vehicle control device according to the aspect (1), the notification controller may associate content or an mode of the information regarding the vehicle identification notified by the terminal device with content or an mode of the information regarding the vehicle identification notified by the vehicle exterior notification unit.

(3) In the vehicle control device according to the aspect (1), the notification controller may synchronize a timing at which the information regarding the vehicle identification is notified by the terminal device with a timing at which the information regarding the vehicle identification is notified by the vehicle exterior notification unit.

(4) In the vehicle control device according to the aspect (1), the notification controller may cause the vehicle exterior notification unit to output one or both of an image and a sound associated with the information regarding the vehicle identification and cause the communication unit to transmit information for outputting one or both of the image and the sound associated with the information regarding the vehicle identification to the terminal device.

(5) In the vehicle control device according to the aspect (1), the notification controller may cause the communication unit to transmit the information for notifying the information regarding the vehicle identification to the terminal device and cause the vehicle exterior notification unit to notify the information regarding the vehicle identification when a distance between the terminal device and the own vehicle or a distance between a boarding area in which the user boards the vehicle to the own vehicle is within a predetermined distance.

(6) In the vehicle control device according to the aspect (1), the notification controller may cause the communication unit to transmit the information for notifying the information regarding the vehicle identification to the terminal device to the terminal device and cause the vehicle exterior notification unit to notify the information regarding the vehicle identification when the recognizer recognizes the user boarding the vehicle.

(7) The vehicle control device according to the aspect (1) may further include a reception unit configured to receive setting of a notification mode associated with the information regarding the vehicle identification.

(8) In the vehicle control device according to the aspect (7), the notification mode may include at least one of a type of image, an image display mode, a type of sound, and a sound output mode.

(9) In the vehicle control device according to the aspect (1), the driving controller may cause the vehicle to stop at a position associated with the boarding area when the user is located in a boarding area in which the user boards the vehicle, and the driving controller may cause the vehicle to travel slowly when the user is not located in the boarding area.

(10) According to another aspect of the present invention, a vehicle control system includes: a vehicle control device configured to control a vehicle; and a terminal device configured to communicate with the vehicle. The vehicle control device includes a recognizer that recognizes a surrounding environment of the vehicle, a driving controller that performs speed control and steering control of the vehicle based on a recognition result of the recognizer, a vehicle-side communication unit that communicates with a terminal device of a user boarding the vehicle, a vehicle exterior notification unit that notifies information regarding vehicle identification to the vehicle exterior, and a notification controller that causes the communication unit to transmit information for notifying the information regarding the vehicle identification to the terminal device to the terminal device and causes the vehicle exterior notification unit to notify the information regarding the vehicle identification when the driving controller causes the vehicle to travel toward a position at which the user is located. The terminal device includes a terminal-side communication unit that communicates with the vehicle control device, and a notification unit that notifies the information regarding the vehicle identification received by the terminal-side communication unit.

(11) According to still another aspect of the present invention, a vehicle control method causes a computer to recognize a surrounding environment of a vehicle; perform speed control and steering control of the vehicle based on a recognition result; and cause a communication unit to transmit information for notifying information regarding vehicle identification to a terminal device to the terminal device and cause a vehicle exterior notification unit to notify the information regarding the vehicle identification to the outside of the vehicle when the vehicle is caused to travel toward a position at which the user is located.

(12) According to still another aspect of the present invention, a computer-readable non-transitory storage medium stores a program causing a computer to recognize a surrounding environment of a vehicle; perform speed control and steering control of the vehicle based on a recognition result; and cause a communication unit to transmit information for notifying information regarding vehicle identification to a terminal device to the terminal device and cause a vehicle exterior notification unit to notify the information regarding the vehicle identification to the outside of the vehicle when a process of causing the vehicle to travel toward a position at which the user is located is performed.

According to the aspects (1) to (12), a user can be allowed to be aware of a vehicle on which the user will board more clearly.

DESCRIPTION OF EMBODIMENTS

Hereinafter, an embodiment of a vehicle control device, a vehicle control system, a vehicle control method, and a storage medium according to the present invention will be described with reference to the drawings. Hereinafter, an embodiment in which a vehicle control system is applied to an automated driving vehicle will be described as an example. In automated driving, for example, one or both of steering and acceleration or deceleration of a vehicle is controlled automatically and driving control is performed. For an automated driving vehicle, driving control may be performed through a manual operation by an occupant.

[Overall Configuration]

Figure 1:
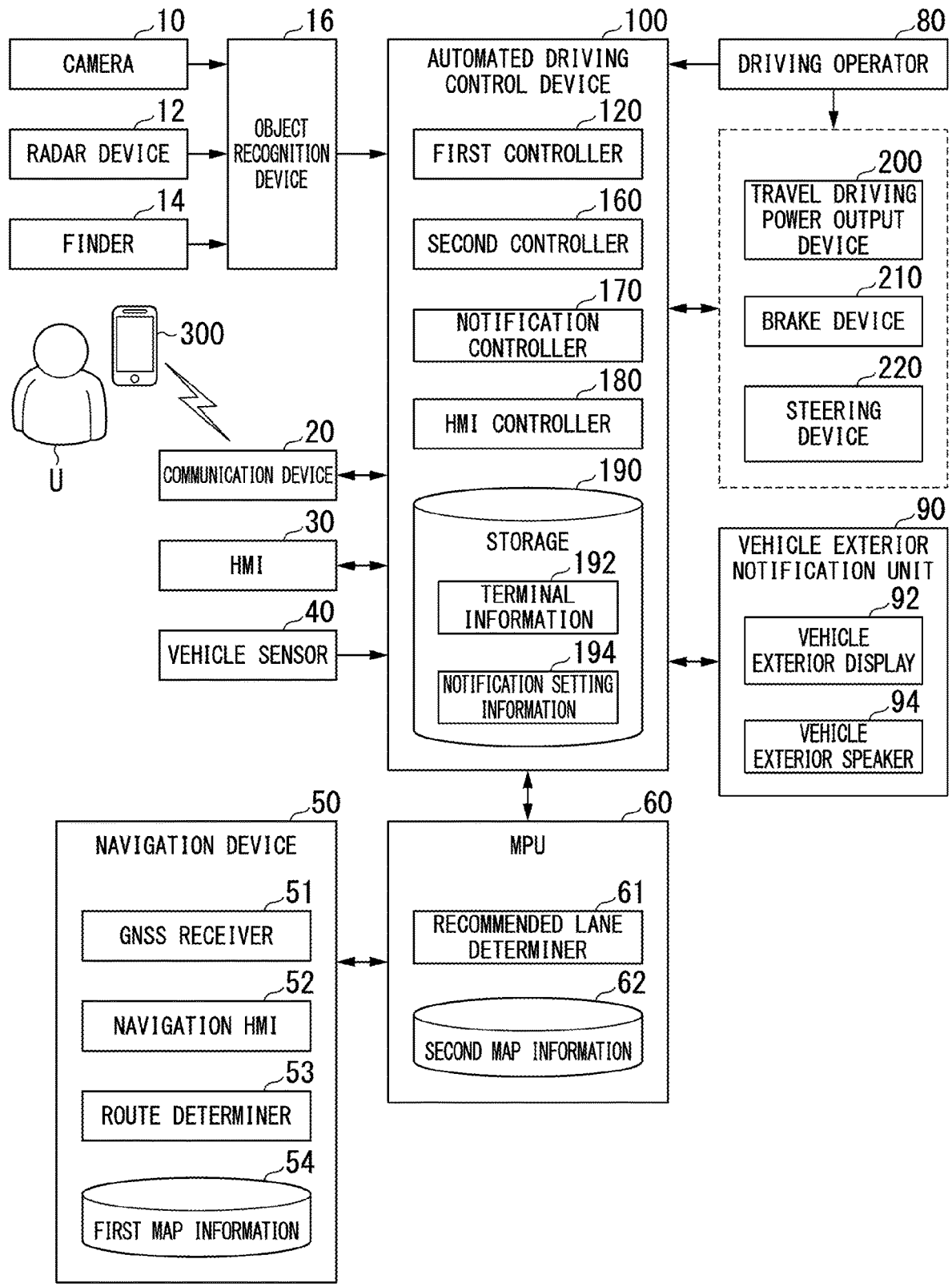
FIG. 1 is a diagram illustrating a configuration of a vehicle system according to an embodiment.

FIG. 1 is a diagram illustrating a configuration of a vehicle system 1 according to an embodiment. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from battery (a secondary battery) such as a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, a vehicle exterior notification unit 90, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added. A combination of the communication device 20 and the automated driving control device 100 is an example of a "vehicle control device." A combination of the vehicle control device and a terminal device 300 is an example of a "vehicle control system." The communication device 20 is an example of a "communication unit" or a "vehicle-side communication unit." The automated driving control device 100 is an example of a "driving controller." A combination of the HMI 30 and an HMI controller 180 is an example of a "reception unit."

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle control system 1 is mounted (hereinafter referred to as a vehicle M). For example, when the camera 10 images a front side, the camera 10 is mounted on an upper portion of a front windshield, a rear surface of a rearview mirror, and the like. For example, the camera 10 repeatedly images the surroundings of the vehicle M periodically. The camera 10 may be a stereo camera.

The radar device 12 radiates radio waves such as millimeter waves to the surroundings of the vehicle M and detects radio waves (reflected waves) reflected from an object to detect at least a position (a distance and an azimuth) of the object. The radar device 12 is mounted on any portion of the vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the vehicle M and measures scattered light. The finder 14 detects a distance to a target based on a time from light emission to light reception. The radiated light is, for example, pulsed laser light. The finder 14 is mounted on any portions of the vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with, for example, the terminal device 300 of a user U using the vehicle M, other vehicles around the vehicle M, a parking lot management device (to be described below), or various server devices, for example, using a network such as a cellular network, a Wi-Fi network, Bluetooth (registered trademark), dedicated short range communication (DSRC), a local area network (LAN), a wide area network (WAN), or the Internet. The user U may be, for example, an owner of the vehicle M or may be a user who merely uses the vehicle M in accordance with a rental car service or a car sharing service, or the like. The terminal device 300 is, for example, a portable terminal such as a smartphone or a tablet terminal carried by the user U.

The HMI 30 presents various types of information to occupants of the vehicle M and receives input operations by the occupants. For example, the HMI 30 includes a display device, a vehicle interior speaker, a buzzer, a touch panel, a switch, and a key. The display device includes, for example, a meter display provided in a portion facing a driver in an instrument panel, a center display provided in the middle of the instrument panel, and a head-up display (HUD). The HUD is, for example, a device that enables an occupant to view an image overlapping a landscape. For example, the HUD enables an occupant to view a virtual image by projecting light including an image to the front windshield or a combiner of the vehicle M.

The vehicle sensor 40 includes a vehicle speed sensor that detects a speed of the vehicle M, an acceleration sensor that detects acceleration, a yaw rate sensor that detects angular velocity around a vertical axis, and an azimuth sensor that detects a direction of the vehicle M. The vehicle sensor 40 may include, for example, a door opening and closing sensor that detects opening or closing of a door or a load sensor that detects a load of a sheet in the vehicle. A result detected by the vehicle sensor 40 is output to the automated driving control device 100.

The navigation device 50 includes, for example, a global navigation satellite system (GNSS) receiver 51, a navigation HMI 52, and a route determiner 53. The navigation device 50 retains first map information 54 in a storage such as a hard disk drive (HDD) or a flash memory. The GNSS receiver 51 specifies a position of the vehicle M based on signals received from GNSS satellites. The position of the vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map is output to the MPU 60. The navigation device 50 may perform route guidance using the navigation HMI 52 based on the route on the map. The navigation device 50 may be realized by, for example, a function of the terminal device 300 of the user U. The navigation device 50 may transmit a present position and a destination to a navigation server via the communication device 20 to acquire the same route as the route on the map from the navigation server. The navigation device 50 outputs the determined route on the map to the MPU 60.

The MPU 60 includes, for example, a recommended lane determiner 61 and retains second map information 62 in a storage such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, parking lot information, and telephone number information. The parking lot information is, for example, the position or shape of a parking lot, a parkable number, whether to perform automated driving, a boarding area, a stopping area, or the like. The second map information 62 may be updated frequently by communicating with another device using the communication device 20.

The driving operator 80 includes, for example, an accelerator pedal, a brake pedal, a shift lever, a steering wheel, a steering variant, a joystick, and other manipulators. A sensor that detects whether there is a manipulation or a manipulation amount is mounted on the driving operator 80. A detection result is output to the automatic driving control device 100 or some or all of the travel driving power output device 200, the brake device 210, and the steering device 220.

The vehicle exterior notification unit 90 includes, for example, a vehicle exterior display 92 and a vehicle exterior speaker 94. The vehicle exterior display 92 is, for example, a transmission type liquid crystal panel formed in at least some of the front windshield, the side windshield, and the rear windshield of the vehicle M. The vehicle exterior display 92 may be an organic electro-luminescence (EL) display pasted on the surface of the exterior body of the vehicle M. The vehicle exterior display 92 may be a liquid crystal display (LCD) fitted into the body or a display panel that serves as a part or the whole of the body. The vehicle exterior display 92 may be a transparent device that radiates light toward a road surface near the vehicle M to project an image to the road surface. The vehicle exterior display 92 displays a predetermined image toward the outside of the vehicle, for example, under the control of a notification controller 170 to be described below. Examples of the image include a color image, a pattern, a mark, text, photo data, or a combination thereof. The image may include an animation image.

The vehicle exterior speaker 94 outputs a predetermined sound to the surrounds of the vehicle M, for example, under the control of the notification controller 170. Examples of the sound include a warning sound or a sound effect, a piece of music, a melody sound, a rhythm sound, and a recorded sound.

The automated driving control device 100 includes, for example, a first controller 120, a second controller 160, the notification controller 170, an HMI controller 180, and a storage 190. Each of the first controller 120, the second controller 160, the notification controller 170, and the HMI controller 180 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage (a storage including a non-transitory storage medium) such as an HDD or a flash memory of the automated driving control device 100 or may be stored in a storage medium (a non-transitory storage medium) detachably mounted on a DVD, a CD-ROM, or the like so that the storage medium is mounted on a drive device to be installed on the HDD or the flash memory of the automated driving control device 100.

Figure 2:
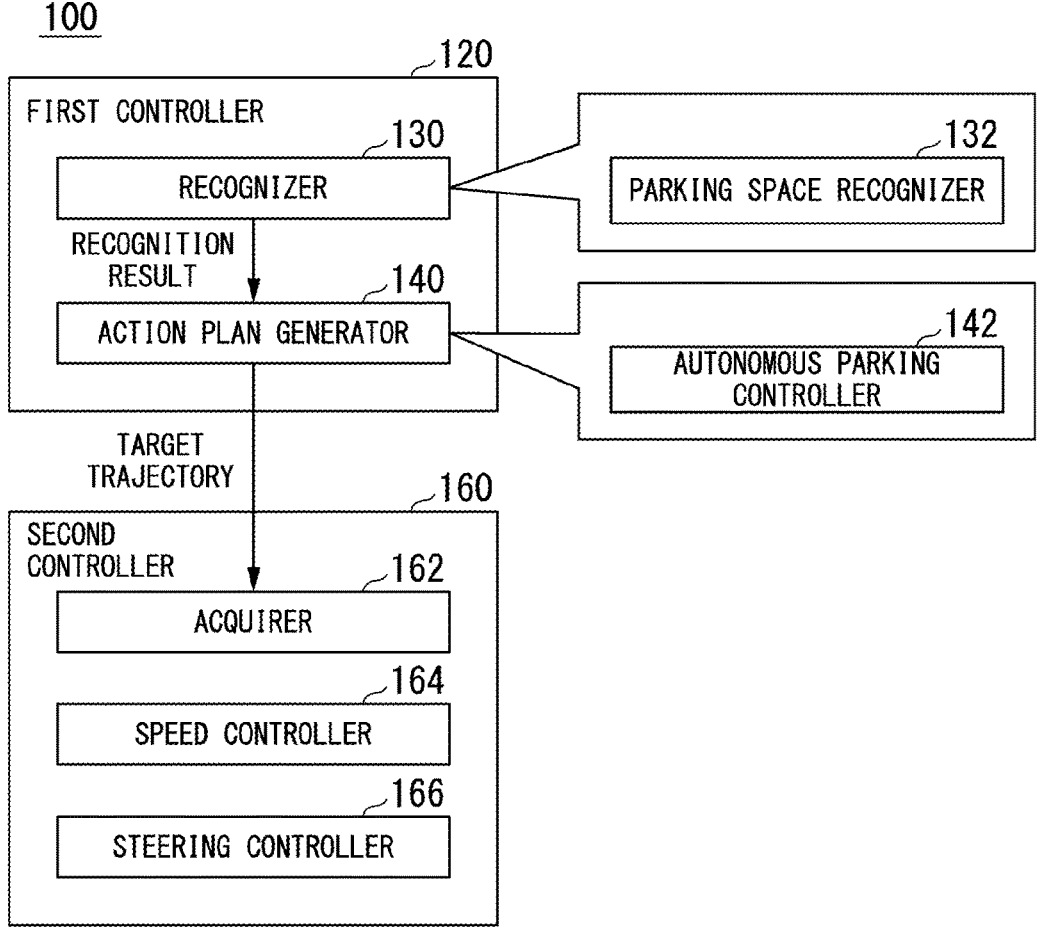
FIG. 2 is a diagram illustrating a functional configuration of a first controller and a second controller.

FIG. 2 is a diagram illustrating a functional configuration of the first controller 120 and the second controller 160. The first controller 120 includes, for example, a recognizer 130 and an action plan generator 140. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed. The first controller 120 performs, for example, an instruction from the MPU 60, the notification controller 170, the HMI controller 180, or the like and control related to automated driving of the vehicle M based on an instruction from the terminal device 300.

The recognizer 130 recognizes surrounding environment of the vehicle M based on information input from the camera 10, the radar device 12, and the finder 14 via the object recognition device 16. For example, the recognizer 130 recognizes states such as positions, speeds, or acceleration of objects around the vehicle M based on the input information. For example, the positions of the objects are recognized as positions on the absolute coordinates in which a representative point (a center of gravity, a center of a driving shaft, or the like) of the vehicle M is the origin and are used for control. The positions of the objects may be represented as representative points such as centers of gravity, corners, or the like of the objects or may be represented as expressed regions. A "state" of an object may include acceleration or jerk of the object or an "action state" (for example, whether a vehicle is changing a lane or is attempting to change the lane).

The recognizer 130 recognizes, for example, a lane in which the vehicle M is traveling (a travel lane). For example, the recognizer 130 recognizes the travel lane by comparing patterns of road mark lines (for example, arrangement of continuous lines and broken lines) obtained from the second map information 62 with patterns of road mark lines around the vehicle M recognized from images captured by the camera 10. The recognizer 130 may recognize a travel lane by mainly recognizing runway boundaries (road boundaries) including road mark lines or shoulders, curbstones, median strips, and guardrails without being limited to road mark lines. In this recognition, the position of the vehicle M acquired from the navigation device 50 or a process result by INS may be added. The recognizer 130 recognizes temporary stop lines, obstacles, red signals, toll gates, entrance gates, stopping areas, and boarding and alighting areas of parking lots, and other road events.

The recognizer 130 recognizes a position or a posture of the vehicle M with respect to the travel lane when the recognizer 130 recognizes the travel lane. For example, the recognizer 130 may recognize a deviation from the middle of a lane of a standard point of the vehicle M and an angle formed with a line extending along the middle of a lane in the travel direction of the vehicle M as a relative position and posture of the vehicle M to the travel lane. Instead of this, the recognizer 130 may recognize a position or the like of the standard point of the vehicle M with respect to a side end portion (a road mark line or a road boundary) of any travel lane as the relative position of the vehicle M to the travel lane.

The recognizer 130 includes a parking space recognizer 132 that is activated in an autonomous parking event to be described below. The details of the function of the parking space recognizer 132 will be described later.

The action plan generator 140 generates an action plan for traveling the vehicle M through automated driving. For example, the action plan generator 140 generates a target trajectory along which the vehicle M travels in future automatically (irrespective of an operation of a driver or the like) so that the vehicle M is traveling along a recommended lane determined by the recommended lane determiner 61 and handles a surrounding situation of the vehicle M based on a recognition result or the like by the recognizer 130 in principle. The target trajectory includes, for example, a speed component. For example, the target trajectory is expressed by arranging spots (trajectory points) at which the vehicle M will arrive in sequence. The trajectory point is a spot at which the vehicle M will arrive for each predetermined travel distance (for example, about several [m]) in a distance along a road. Apart from the trajectory points, target acceleration and a target speed are generated as parts of the target trajectory for each of predetermined sampling times (for example, about a decimal point of a second). The trajectory point may be a position at which the vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low speed track traveling event, a lane changing event, a branching event, a joining event, a takeover event, an autonomous parking event in which parking are performed through automated driving in a parking lot of valet parking or the like, and the like. The action plan generator 140 generates the target trajectory in accordance with an activated event. The action plan generator 140 includes an autonomous parking controller 142 that is activated when an autonomous parking event is performed. The details of a function of the autonomous parking controller 142 will be described later.

The second controller 160 controls the travel driving power output device 200, the brake device 210, and the steering device 220 so that the vehicle M passes along the target trajectory generated by the action plan generator 140 at a scheduled time.

The second controller 160 includes, for example, an acquirer 162, a speed controller 164, and a steering controller 166. The acquirer 162 acquires information regarding the target trajectory (trajectory points) generated by the action plan generator 140 and stores the information in a memory (not illustrated). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the vehicle M and the feedback control based on separation from the target trajectory in combination.

Referring back to FIG. 1, the notification controller 170 causes the communication device 20 to transmit information regarding vehicle identification to the terminal device 300 and controls the vehicle exterior notification unit 90 to notify the information regarding the vehicle identification when control is executed to travel the vehicle M toward a position at which the user U outside the vehicle is located through the automated driving. The information regarding the vehicle identification includes, for example, notification content notified to the outside of the vehicle by the vehicle to facilitate the user U to be easily aware of the vehicle on which the user U boards or notification content notified from the terminal device 300. The notification content includes one or both of an image and a sound associated with the information regarding the vehicle identification. The details of a function of the notification controller 170 will be described later.

The HMI controller 180 notifies an occupant of predetermined information through the HMI 30. The predetermined information may include information regarding travel of the vehicle M, such as information regarding a state of the vehicle M or information regarding driving control. The information regarding the state of the vehicle M includes, for example, a speed, an engine speed, a shift position, or the like of the vehicle M. The information regarding the driving control includes, for example, information regarding whether to perform the automated driving or information regarding the degree of driving support through the automated driving. The predetermined information may include information not associated with travel of the vehicle M, such as a television program or content (for example, a movie) stored in a storage medium such as DVD. The predetermined information may include, for example, information regarding a communication state of the vehicle M with the terminal device 300, a current position or a destination in the automated driving, or a remaining fuel amount of the vehicle M. The HMI controller 180 may output the information received by the HMI 30 to the communication device 20, the navigation device 50, the first controller 120, and the like.

The HMI controller 180 may communicate with the terminal device 300 stored in the terminal information 192 via the communication device 20 and transmit predetermined information to the terminal device 300. The HMI controller 180 may output information acquired from the terminal device 300 to the HMI 30.

For example, the HMI controller 180 may perform control such that a registration screen on which the terminal device 300 communicating with the vehicle M is registered is displayed on a display device of the HMI 30 and information regarding the terminal device 300 input via the registration screen is stored as terminal information 192 in the storage 190. The HMI controller 180 may perform control such that a registration screen for registering notification content associated with the information regarding the vehicle identification is displayed on the display device of the MHI 30 and notification content input via the registration screen is stored as notification setting information 194 in the storage 190. The above-described terminal information 192 or notification setting information 194 is registered at, for example, at the time of boarding of the user U or a predetermined timing before automated driving such as an autonomous parking event is started. The above-described terminal information 192 or notification setting information 194 may be registered in accordance with an application program (a vehicle cooperation application to be described below) installed in the terminal device 300.

The HMI controller 180 may transmit information obtained by the HMI 30, the notification controller 170, and the HMI controller 180 to the terminal device 300 or another external device via the communication device 20.

The storage 190 is realized by, for example, an HDD, a flash memory, an EEPROM, a read-only memory (ROM), a random access memory (RAM), or the like. In the storage 190, for example, the terminal information 192, the notification setting information 194, and other information are stored.

The travel driving power output device 200 outputs a travel driving force (torque) for traveling the vehicle to a driving wheel. The travel driving power output device 200 includes, for example, a combination of an internal combustion engine, an electric motor and a transmission, and an electronic controller (ECU) controlling these units. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

[Terminal Device]

Figure 3:
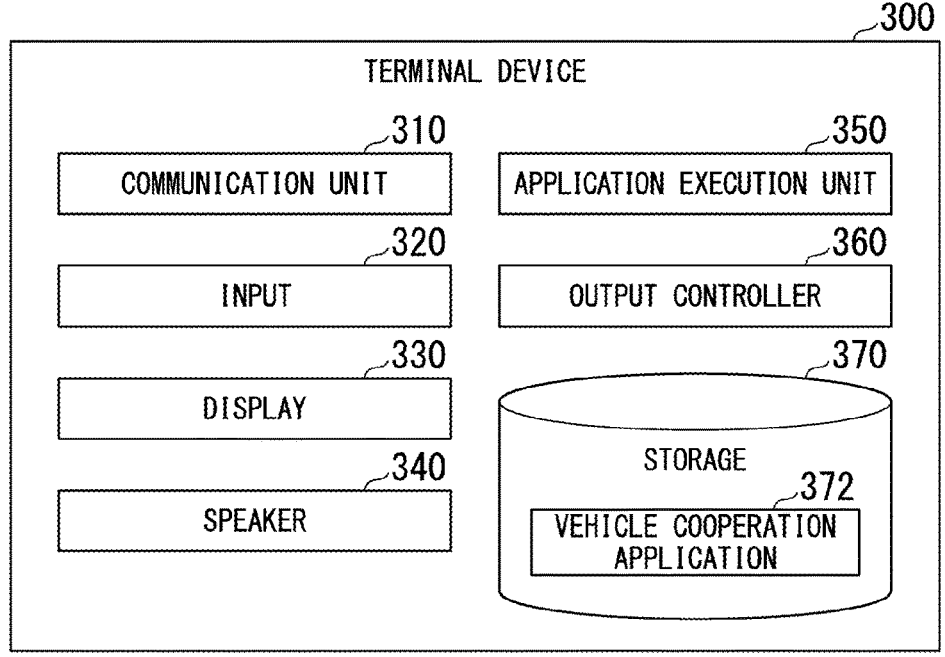
FIG. 3 is a diagram illustrating an example of a functional configuration of a terminal device.

FIG. 3 is a diagram illustrating an example of a functional configuration of the terminal device 300. The terminal device 300 includes, for example, a communication unit 310, an input 320, a display 330, a speaker 340, an application execution unit 350, an output controller 360, and a storage 370. The communication unit 310, the input 320, the application execution unit 350, and the output controller 360 are realized, for example, by causing a hardware processor such as a CPU to execute a program (software). Some or all of the constituent elements may be realized by hardware (a circuit unit including circuitry) such as an LSI, an ASIC, an FPGA, or a GPU or may be realized by software and hardware in cooperation. For example, the above-described program may be stored in advance in a storage (a storage including a non-transitory storage medium) such as an HDD or a flash memory included in advance in the terminal device 300 or may be stored in a storage medium (a non-transitory storage medium) detachably mounted on a DVD, a CD-ROM, or the like so that the storage medium is mounted on a drive device to be installed on the storage 370. The communication unit 310 is an example of a "terminal-side communication unit." A combination of the display 330, the speaker 340, and the output controller 360 is an example of a "notification unit."

The communication unit 310 communicates with the vehicle M or another external device using, for example, a cellular network or a network such as a Wi-Fi network, Bluetooth, DSRC, LAN, WAN, or the Internet.

For example, the input 320 receives an input by a user operating various keys, a button, or the like. The display 330 is, for example, a liquid crystal display (LCD). The input 320 may be integrated with the display 330 as a touch panel. The display 330 displays information regarding vehicle identification and information necessary to use another terminal device 300 under the control of the output controller 360. The speaker 340 outputs, for example, a predetermined sound under the control of the notification controller 170.

The application execution unit 350 is realized by executing the vehicle cooperation application 372 stored in the storage 370. The vehicle cooperation application 372 is, for example, an application program that communicates with the vehicle M via a network and transmits an entrance instruction or a return instruction through automated driving to the vehicle M. The vehicle cooperation application 372 acquires information transmitted by the vehicle M and causes the output controller 360 to perform a predetermined notification based on the acquired information. For example, the application execution unit 350 performs control such that an image is displayed on the display 330 or a sound is output by the speaker 340 based on notification content or the like associated with the information regarding the vehicle identification when the information regarding the vehicle identification is received by the communication unit 310 from the vehicle M after a return instruction is given.

The vehicle cooperation application 372 may transmit positional information of the terminal device 300 acquired by a global positioning system (GPS) device (not illustrated) embedded in the terminal device 300 to the vehicle M, may register terminal information, notification content, or the like, or may perform a process related to other vehicle cooperation.

The output controller 360 controls content of an image or a display mode displayed on the display 330 and content or an output mode of a sound output by the speaker 340. For example, the output controller 360 may cause the display 330 to display an image based on the notification content or the like associated with the information regarding the vehicle identification received from the vehicle M or may cause the speaker to output a sound received from the vehicle M. The output controller 360 may acquire an image or a sound corresponding to the notification content from an external device or generate the image or the sound in the terminal device 300 and may cause the display 330 and the speaker 340 to output the image or the sound. The output controller 360 may cause the display 330 and the speaker 340 to output information instructed from the vehicle cooperation application 372 or various kinds of information necessary to use the terminal device 300.

The storage 370 is realized by, for example, an HDD, a flash memory, an EEPROM, a ROM, a RAM, or the like. In the storage 370, for example, the vehicle cooperation application 372 and other information are stored.

[Driving Control]

Next, driving control in travel through automated driving of the vehicle M will be described specifically as an example of the driving control according to the embodiment. Hereinafter, a scenario in which autonomous parking is performed in travel through automated driving in valet parking of a facility to be visited will be described as an example of the automated control in the travel through the automated driving of the vehicle M. Hereinafter, "unmanned travel" in which the unmanned vehicle M travels is assumed to be used as an example of "travel through automated driving." The automated driving in the embodiment may be performed in a state in which an occupant is in the vehicle.

Figure 4:
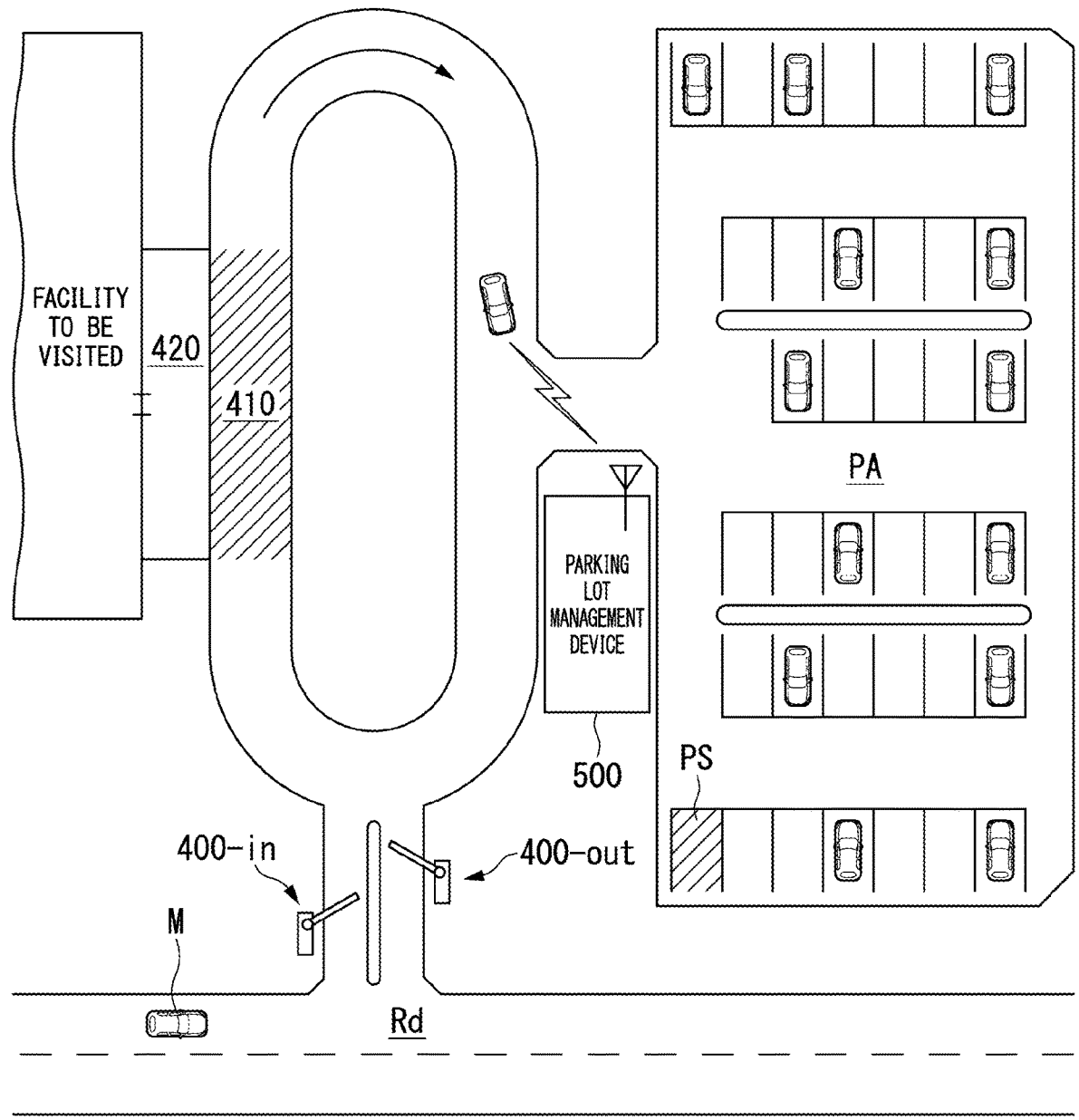
FIG. 4 is a diagram schematically illustrating a scenario in which an autonomous parking event according to the embodiment is performed.

FIG. 4 is a diagram schematically illustrating a scenario in which an autonomous parking event according to the embodiment is performed. In the example of FIG. 4, a parking lot (for example, valet parking) PA of a facility to be visited is illustrated. In the parking lot PA, it is assumed that a gate 400-in, a gate 400-out, a stopping area 410, and a boarding and alighting area 420 are provided along a path from a road Rd to the facility to be visited. The boarding and alighting area 420 may be divided into a boarding area and an alighting area. In the example of FIG. 4, a parking lot management device 500 that manages a parking situation of the parking lot PA and transmits a vacancy state or the like to vehicles is assumed to be provided.

Here, a process at the time of entrance and the time of return of the vehicle M in accordance with an autonomous parking event will be described. The process at the time of entrance and the time of return is performed, for example, when an entrance instruction and a return instruction from the terminal device 300 can be received, a preset time has passed, or another execution condition is satisfied.

[Autonomous Parking Event: At Time of Entrance]

The autonomous parking controller 142 causes the vehicle M to park in a parking space of the parking lot PA based on, for example, information acquired by the communication device 20 from the parking lot management device 500. In this case, the vehicle M passes through the gate 400-in and enters a stopping area 410 through manual driving or automated driving. The stopping area 410 faces the boarding and alighting area 420 connected to the facility to be visited. In the boarding and alighting area 420, an eave is provided to block rain and snow.

After an occupant (the user U) gets out of the vehicle in the stopping area 410, the vehicle M performs unmanned automated driving and starts an autonomous parking event for moving to a parking space PS in the parking area PA. A trigger to start the autonomous parking event may be, for example, any operation (for example, an entrance instruction from the terminal device 300) by the user U or may be wireless reception of a predetermined signal from the parking lot management device 500. When the autonomous parking event starts, the autonomous parking controller 142 controls the communication device 20 such that a parking request is transmitted to the parking lot management device 500. Then, the vehicle M moves in accordance with guidance of the parking lot management device 500 or moves while performing sensing by itself from the stopping area 410 to the parking area PA.

Figures 5, 6:
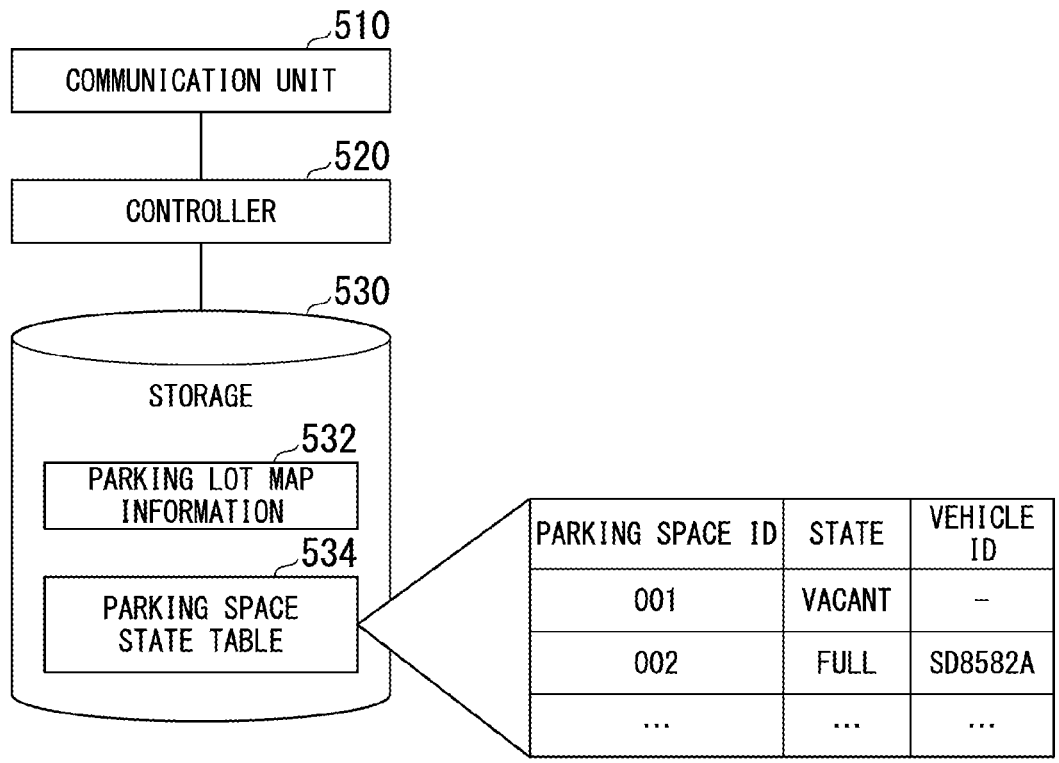
FIG. 5 is a diagram illustrating an example of a configuration of a parking lot management device.
FIG. 6 is a diagram illustrating an example of content of notification setting information.

FIG. 5 is a diagram illustrating an example of a configuration of the parking lot management device 500. The parking lot management device 500 includes, for example, a communication unit 510, a controller 520, and a storage 530. The storage 530 stores information such as parking lot map information 532 and a parking space state table 534.

The communication unit 510 communicates with the vehicle M and other vehicles wirelessly. The controller 520 guides the vehicle to the parking space PS based on information acquired by the communication unit 510 and information stored in the storage 530. The parking lot map information 532 is information that geometrically represents a structure of the parking area PA. The parking lot map information 532 includes coordinates of each parking space PS. In the parking space state table 534, for example, a state which indicates a vacant state and a full (parking) state and a vehicle ID which is identification information of a vehicle parked in the case of the full state are associated with a parking space ID which is identification information of the parking space PS.

When the communication unit 510 receives a parking request from a vehicle, the controller 520 extracts the parking space PS of which a state is a vacant state with reference to the parking space state table 534, acquires a position of the extracted parking space PS from the parking lot map information 532, and transmits a suitable route to the acquired position of the parking space PS to the vehicle through the communication unit 510. The controller 520 instructs a specific vehicle to stop or move slowly, as necessary, based on a positional relation between a plurality of vehicles so that the vehicles do not simultaneously advance to the same position.

In a vehicle receiving the route (hereinafter assumed to be the vehicle M), the autonomous parking controller 142 generates a target trajectory based on the route. When the vehicle M approaches the parking space PS which is a target, the parking space recognizer 132 recognizes parking frame lines or the like marking the parking space PS, recognizes a detailed position of the parking space PS, and supplies the detailed position of the parking space PS to the autonomous parking controller 142. The autonomous parking controller 142 receives the detailed position of the parking space PS, corrects the target trajectory, and parks the vehicle M in the parking space PS.

The present invention is not limited to the above description, and the autonomous parking controller 142 may find an empty parking space by itself based on a detection result by the camera 10, the radar device 12, the finder 14, or the object recognition device 16 irrespective of communication and may cause the vehicle M to park in the found parking space.

[Autonomous Parking Event: Time of Return]

The autonomous parking controller 142 and the communication device 20 are maintained in an operation state even while the vehicle M is parked. For example, when the communication device 20 receives a pickup request (an example of a return instruction) from the terminal device 300, the autonomous parking controller 142 activates a system of the vehicle M and causes the vehicle M to move to the stopping area 410. At this time, the autonomous parking controller 142 controls the communication device 20 to transmit a launch request to the parking lot management device 500. The controller 520 of the parking lot management device 500 instructs a specific vehicle to stop or move slowly, as necessary, based on a positional relation between a plurality of vehicles so that the vehicles do not simultaneously enter the same position, as in the time of entrance.

The autonomous parking controller 142 determines whether the user U is in the boarding and alighting area (the boarding area when the boarding and alighting area is divided into a boarding area and an alighting area) 420. When it is determined that the user U is in the boarding and alighting area, the vehicle M is caused to stop in a vacant space of the stopping area 410 within a predetermined distance from a position at which the user U is present. In this case, the autonomous parking controller 142 acquires positional information from the terminal device 300. When the acquired positional information is in the boarding and alighting area 420, the autonomous parking controller 142 determines that the user U is in the boarding and alighting area 420. Based on a detection result by the object recognition device 16, the camera 10, the radar device 12, or the finder 14, the autonomous parking controller 142 may determine whether the user U is in the boarding and alighting area 420. In this case, the autonomous parking controller 142 acquires feature information of the user U from the detection result by the object recognition device 16, the camera 10, the radar device 12, or the finder 14 in advance before entrance of the vehicle M. Then, the autonomous parking controller 142 compares the feature information of a person obtained from a detection result at the time of return with the feature information of the user U and determines whether the user U is present when similarity is equal to or greater than a predetermined value.

After the vehicle stops and the user U is allowed to board, an operation of the autonomous parking controller 142 is stopped. Thereafter, manual driving or automated driving by another functional unit is started. In this case, the autonomous parking controller 142 determines that the user U boards, for example, when it is detected that a door of the vehicle M is opened or closed, an operation on the driving operator 80 or the HMI 30 is received, or it is detected that a load on a seat in the vehicle is equal to or greater than a predetermined value.

When the autonomous parking controller 142 determines that the user U is not in the boarding and alighting area 420, the autonomous parking controller 142 may perform control such that the vehicle M moves slowly and an arrival time in the stopping area 410 is delayed. Thus, it is possible to shorten a waiting time in the stopping area 410 and alleviate congestion in the stopping area 410.

When an elapsed time after having stopped in the stopping area 410 is equal to or greater than a predetermined time and it is not detected that the user U boards, the autonomous parking controller 142 may generate a cyclic route circulating the stopping area 410 and perform automated driving for circulating the cyclic route. When the foregoing condition is satisfied, the autonomous parking controller 142 may perform the automated driving to park the vehicle M in the parking lot PA again. Thus, it is possible to suppress congestion in the stopping area 410.

[Notification Controller]

Next, details of a function of the notification controller 170 will be described. Hereinafter, notification control in a process at the time of return of the above-described autonomous parking event will be described. For example, when the vehicle M is parked in the parking lot PA and a return instruction is received from the terminal device 300, the autonomous parking event starts a return process of causing the vehicle M to travel toward to a position of the user U to meet the user U. Then, the notification controller 170 causes the communication device 20 to transmit information regarding the vehicle identification to the terminal device 300 at a predetermined timing and causes the vehicle exterior notification unit 90 to notify the information regarding the vehicle identification. The predetermined timing is, for example, a timing at which a distance between the terminal device 300 and the vehicle M is determined to be within a predetermined distance. The notification controller 170 receives the positional information of the terminal device 300 transmitted by the terminal device 300 and determines whether the distance between the terminal device 300 and the vehicle M is within a predetermined distance based on the received positional information and the positional information of the vehicle M.

The notification controller 170 may determine whether the distance is within a predetermined distance by using the position of the stopping area 410 and the boarding and alighting area 420 obtained from the second map information 62 or the parking lot management device 500, instead of the distance from the terminal device 300.

For example, the notification controller 170 acquires notification setting information 194 stored as the information regarding the vehicle identification and causes the vehicle exterior notification unit 90 to notify an image or a sound included in the acquired notification setting information 194 stored in the storage 190. Further, the notification controller 170 acquires address information of the terminal device 300 of the user U from the terminal information 192 and causes the communication device 20 to transmit the notification setting information 194 to the terminal device 300 based on the acquired address information.

FIG. 6 is a diagram illustrating an example of content of the notification setting information 194. In the notification setting information 194, information for identifying the vehicle M in accordance with content to be notified is registered. For example, image setting information and sound setting information are associated with the notification setting information 194. The image setting information includes, for example, a type of image and a display mode. The type of image includes, for example, identification information such as a color image, a pattern, a mark, text, photo data, and an animation image. The display mode includes, for example, a display timing, a display period (a blinking level), a display position, and the like of an image corresponding to the type of image. The sound setting information includes, for example, a type of sound and an output mode for identifying a sound. The output mode includes, for example, an output timing, a volume level, and the like of a sound corresponding to the type of sound. In the notification setting information 194, only one of the image setting information and the sound setting information may be stored.

The notification controller 170 links notification content of the terminal device 300 and the vehicle exterior notification unit 90 based on the image setting information or the sound setting information included in the notification setting information 194. "Linking" refers to, for example, association of an image or a display mode displayed from each of the terminal device 300 and the vehicle exterior notification unit 90 or association of a sound or an output mode output from each of the terminal device 300 and the vehicle exterior notification unit 90. "Linking" may include synchronization of control related to a notification of each of the terminal device 300 and the vehicle exterior notification unit 90. By linking the notification content in the terminal device 300 and the vehicle exterior notification unit 90, it is possible to allow the user U to be more aware of the boarding target vehicle M (a vehicle that has come for them).

The above-described notification setting information 194 may be fixed information which is determined in advance or may be information which can be set by the user U. When the user U sets the information, the notification controller 170 causes a display device of the HMI 30 to display a registration image in which the HMI controller 180 registers the notification content and causes the storage 190 to store information registered through a user operation from the registration image.

Figure 7:
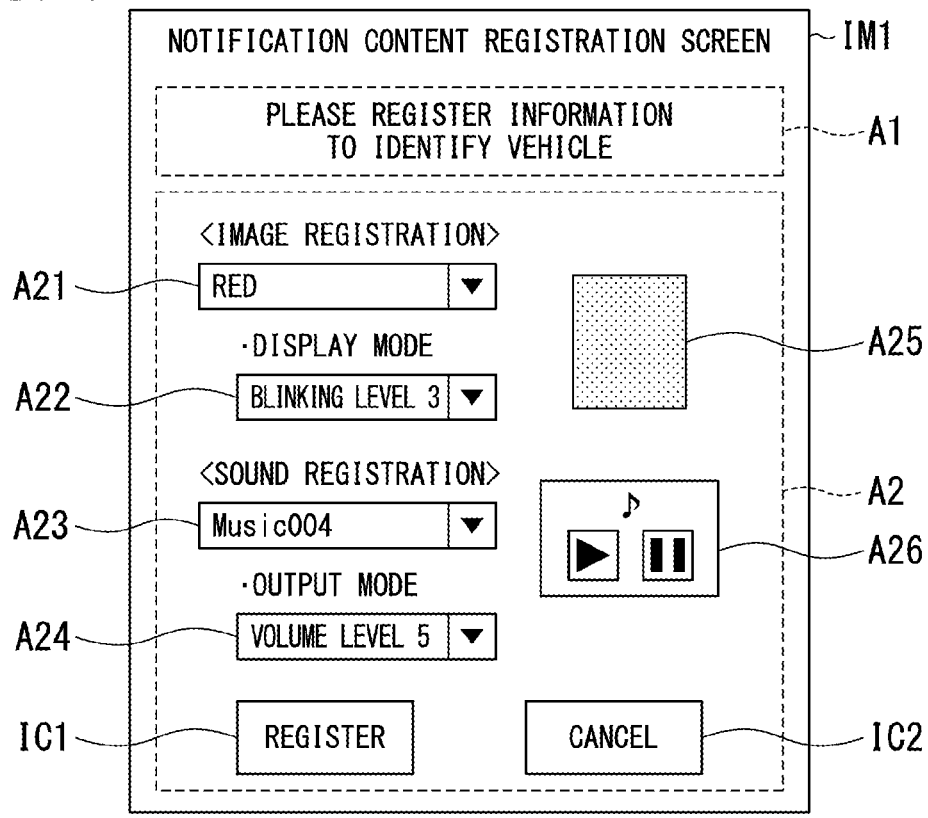
FIG. 7 is a diagram illustrating an example of an image displayed on an HMI as a notification content registration screen.

FIG. 7 is a diagram illustrating an example of an image IM1 displayed on the HMI 30 as a notification content registration screen. The image IM1 includes, for example, a text display region A1 and a selected item display region A2. Content, a layout, and the like displayed in the image IM1 are not limited thereto. The same applies to the description of other images.

In the text display region A1, text information for prompting the user U to register to identify a vehicle is displayed. The selected item display region A2 includes, for example, an image type input region A21, a display mode input region A22, a sound content input region A23, an output mode input region A24, a set image display region A25, a set sound reproduction region A26, and graphical user interface (GUI) switches IC1 and IC2. In the image type input region A21, the display mode input region A22, the sound content input region A23, and the output mode input region A24, a combo-box is shown in an example of an input format. Another input format such as a list box may be used. The user U may determine one option among a plurality of options which are determined in advance or may set any image or sound stored in the storage 190 in a predetermined input region of the image IM1 by the HMI 30.

Here, the HMI controller 180 recognizes information input by the HMI 30 in the image IM1 and displays an image associated with the type of image and the display mode input in the image type input region A21 and the display mode input region A22 in the set image display region A25. Thus, the user U can check an mode of the image actually notified in accordance with the set content more specifically. The HMI controller 180 may reproduce a sound associated with the sound content and the output mode input in the sound content input region A23 and the output mode input region A24. In this case, the HMI controller 180 may display GUI switches for reproducing or stopping a sound in the set sound reproduction region A26 and reproduce or stop the sound through an operation on each switch. Thus, the user U can check the sound at a timing at which the user U desires to hear the sound.

When the GUI switch IC1 is selected, the HMI controller 180 causes the storage 190 to store content input in each input region of the selected item display region A2 as the notification setting information 194. Thus, a vehicle which the user U boards can be identified in accordance with an image or a sound preferred by the user U. Since a notification is performed in accordance with notification content set in advance by the user U, a boarding target vehicle can be identified more clearly.

When a selection of the GUI switch IC2 is received after an input to the selected item display region A2 or before completion of the input, the HMI controller 180 ends the display of the image IM1 without storing the information input in the selected item display region A2.

When there is an input region with no input in each input region of the selected item display region A2, the notification controller 170 does not perform a notification corresponding to the input region or performs a notification in accordance with standard notification content determined in advance.

Figure 8:
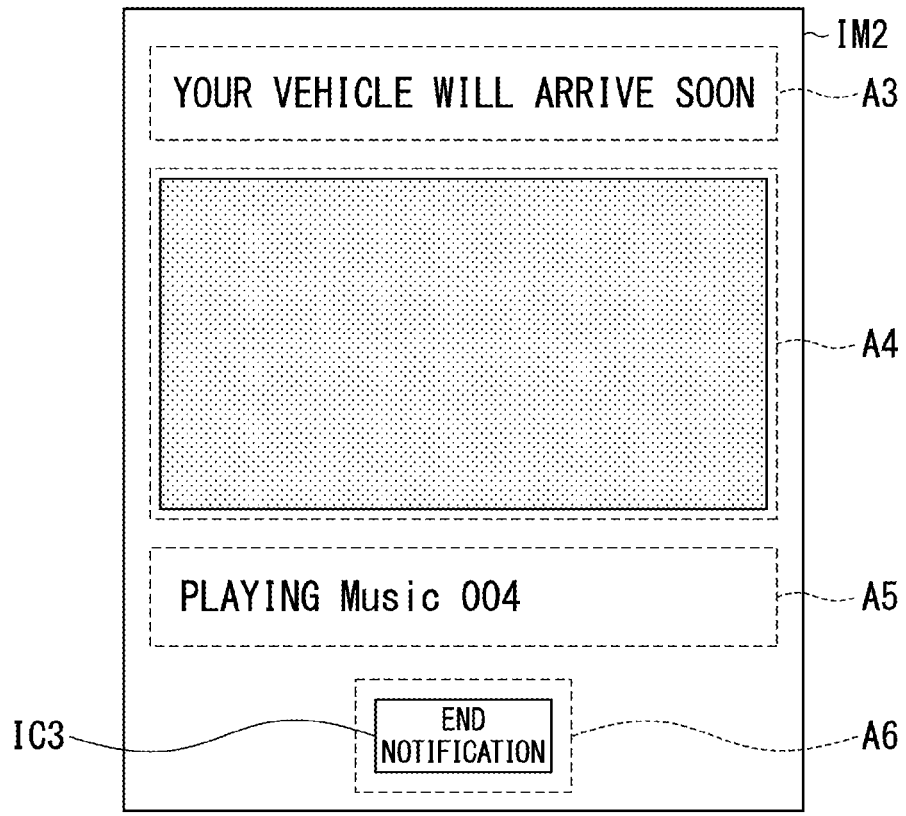
FIG. 8 is a diagram illustrating an example of an image displayed on a display of the terminal device.

The application execution unit 350 of the terminal device 300 causes the display 330 to display an image and causes the speaker 340 to output a sound under the control of the output controller 360 based on the information regarding the vehicle identification received from the vehicle M. FIG. 8 is a diagram illustrating an example of an image IM2 displayed on the display 330 of the terminal device 300. The image IM2 includes a text display region A3, an image display region A4, a sound information display region A5, and a selected item display region A6.

In the text information region A1, information regarding a travel situation of the vehicle M is displayed. In FIG. 8, text "Your vehicle will arrive soon," is displayed as an example of information regarding the travel situation of the vehicle M. The information regarding the travel situation of the vehicle M may include, for example, information regarding a distance from the terminal device 300 to the vehicle M or a time until arrival. In this case, the above-described distance or time is calculated by the application execution unit 350 based on positional information or speed information of the vehicle M received from the vehicle M or positional information of the terminal device 300.

In the image display region A4, an image controlled by the output controller 360 is displayed in association with the image setting information included in the notification setting information 194. In the sound information display region A5, information regarding a sound (for example, a type of sound such as the title of a piece of music) output from the speaker 340 by the output controller 360 is displayed. In the example of FIG. 8, text "playing Music 004" is displayed as an example of the information regarding the sound. In accordance with the above-described display content, the user U can be aware of content of an image displayed to the outside of the vehicle M by the boarding target vehicle M or a sound heard from the vehicle M in advance and more accurately.

In the selected item display region A6, a notification is ended and a GUI switch IC3 for ending the display of the image IM2 is displayed. When the GUI switch IC3 is selected, the output controller 360 ends the image display or the sound output. The output controller 360 may transmit a signal for ending the notification to the vehicle M via the communication unit 310.

The notification controller 170 of the vehicle M causes the vehicle exterior notification unit 90 to end the notification based on the signal for ending the notification received from the terminal device 300. The notification controller 170 may cause the vehicle exterior notification unit 90 to end the notification when it is detected that the user U boards the vehicle M.

Figure 9:
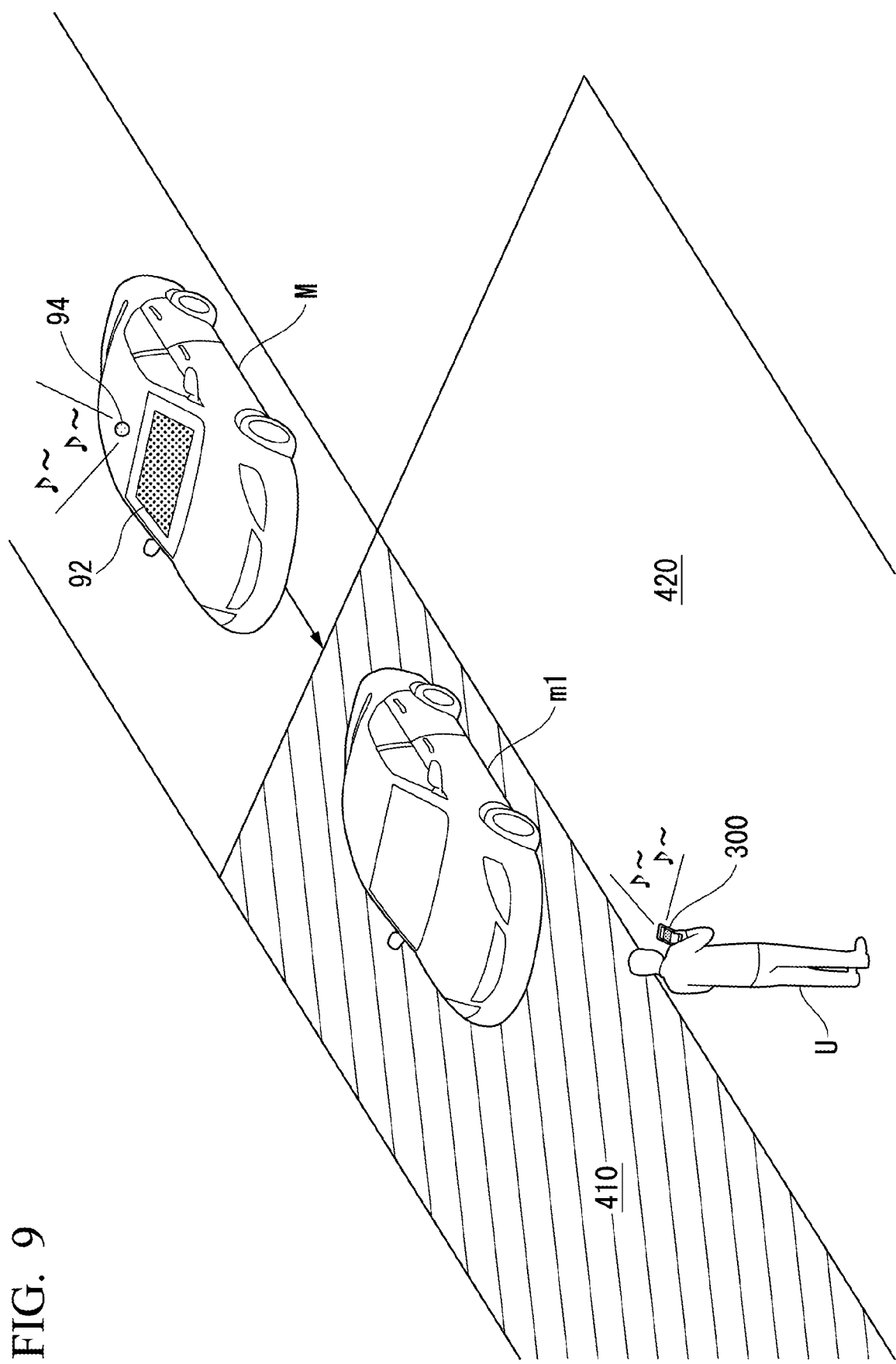
FIG. 9 is a diagram illustrating an example of a scenario in which notification control by the terminal device and a vehicle is performed.

FIG. 9 is a diagram illustrating an example of a scenario in which a notification by the terminal device 300 and the vehicle M is performed. In the example of FIG. 9, it is assumed that the user U is in the boarding and alighting area 420 and the vehicle M is approaching the stopping area 410. Another vehicle m1 is assumed to be stopped in the stopping area 410. In the example of FIG. 9, a notification is assumed to be performed using an image and a sound as a notification mode in the embodiment.

For example, the notification controller 170 transmits the information regarding the vehicle identification to the terminal device 300 and performs a notification through image display and sound output from the vehicle exterior notification unit 90 based on the positional information with the terminal device 300. In the example of FIG. 9, an image set as image setting information is displayed on a liquid crystal panel formed in a part of the front windshield as an example of the vehicle exterior display 92, and a sound set as the sound setting information is output by the vehicle exterior speaker 94 installed in an upper portion of the vehicle M. In the example of FIG. 9, similar notification content to notification content of the vehicle is linked and output from the terminal device 300 of the user U.

Thus, for example, even in a situation in which the user U cannot be aware of features of a vehicle due to dark surroundings or a situation in which a similar vehicle (for example, the other vehicle m1) is nearby, as illustrated in FIG. 9, the user U can easily specify the vehicle M based on the notification content of the image or the sound. Since the sound is notified to the outside of the vehicle even in a situation in which the user U cannot view the vehicle M from the position of the user U, the user U can be aware of the approaching vehicle M early on.

When an image is displayed on the vehicle exterior display 92, the notification controller 170 may change a display position of the image by causing the display position of the image to correspond to the position of the vehicle M or the direction of the user U viewed from the vehicle M. For example, when the vehicle M is approaching the stopping area 410 (when the vehicle M has not arrived at the stopping area 410), the user U is highly likely to view the front side of the vehicle M from the boarding and alighting area 420. Therefore, as illustrated in FIG. 9, the notification controller 170 displays the image on the liquid crystal panel formed in the part of the front windshield, as illustrated in FIG. 9.

When the vehicle M is passing through the stopping area 410 or is stopped in the stopping area 410, the user U is highly likely to see a lateral side of the vehicle M from the side of the boarding and alighting area 420. Therefore, the notification controller 170 displays an image on a liquid crystal display panel formed in a part of the side windshield which is the side of the boarding and alighting area 420 or a display inserted into the body. Thus, the user U can be aware of the notified image more reliably.

[Process Flow]

Figure 10:
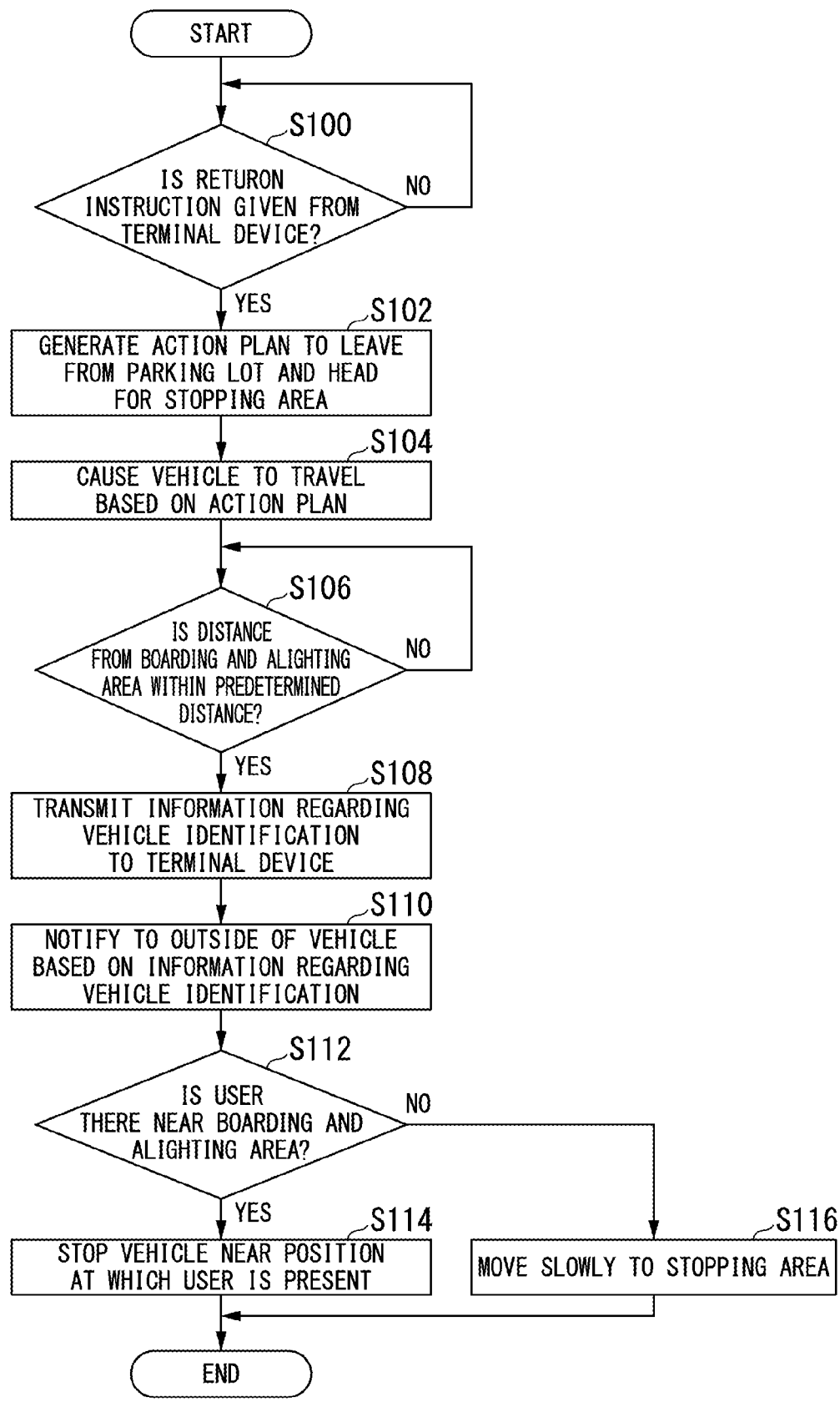
FIG. 10 is a flowchart illustrating an example of a flow of a process performed by an automated driving control device according to an embodiment.

FIG. 10 is a flowchart illustrating an example of a flow of a process performed by the automated driving control device 100 according to an embodiment. Hereinafter, a return process in the above-described autonomous parking event will be mainly described. First, the first controller 120 determines whether a return instruction is given from the terminal device 300 (step S100). When the first controller 120 determines that no return instruction is given, the first controller 120 waits until the return instruction is given.

When the first controller 120 determines that the return instruction is given, the first controller 120 generates an action plan to cause the vehicle M to leave from the parking lot PA and head for the stopping area 410 (step S102). Subsequently, the second controller 160 cause the vehicle to travel based on the action plan (specifically, a target trajectory based on the action plan) (step S104).

Subsequently, the notification controller 170 determines whether the distance from the boarding and alighting area (in particular, the boarding area) 420 in which the user U boards the vehicle M is within a predetermined distance (step S106). In the process of step S106, a distance from the terminal device 300, a distance from the stopping area 410, or a distance from the user U recognized by the camera 10 or the like may be used instead of the distance from the boarding and alighting area 420.

When it is determined in the process of step S106 that the distance from the boarding and alighting area 420 is not within the predetermined distance, the vehicle M continues to travel. When the notification controller 170 determines that the distance from the boarding and alighting area 420 is within the predetermined distance, the notification controller 170 transmits the information regarding the vehicle identification (for example, the notification setting information 194) to the terminal device 300 while the vehicle M continues to travel (step S108). Subsequently, the notification controller 170 causes the vehicle exterior notification unit 90 to notify to the outside of the vehicle based on the notification content associated with the information regarding the vehicle identification (step S110).

Subsequently, the first controller 120 determines whether the user U is present near the boarding and alighting area 420 (for example, the boarding area) (step S112). When the first controller 120 determines that the user U is present near the boarding and alighting area 420, the first controller 120 generates an action plan to cause the vehicle M to stop in the stopping area 410 near the position at which the user U is present and causes the vehicle M to stop in accordance with the generated action plan (step S114). When the first controller 120 determines that the user U is not present near the boarding and alighting area 420, the first controller 120 generates an action plan to cause the vehicle M to move slowly until the vehicle M arrives at the stopping area 410 and causes the vehicle M to move slowly in accordance with the generated action plan (step S116). Thus, the process of the flowchart ends.

According to the above-described embodiment, the user can be aware of the vehicle on which the user boards more clearly. Specifically, according to the above-described embodiment, by linking the notification modes of both the vehicle M and the terminal device 300 and outputting the same image or sound at the same timing, the user can be allowed to be aware of boarding at a visual sense or an auditory sense more easily. Accordingly, for example, even when a plurality of vehicles are approaching at the same timing or there are a plurality of similar vehicles, the vehicle on which the user boards can be identified.

MODIFICATION EXAMPLES

In the notification control in the above-described terminal device 300 may be used to recognize the user U from the vehicle M. For example, the user U holds a display screen side of the terminal device 300 on which a notification is realized based on the information regarding the vehicle identification toward a vehicle stopping in the stopping area 410 or a vehicle approaching the stopping area 410. The notification controller 170 acquires an image or a display mode displayed on the screen of the terminal device 300 from an analysis result of an image captured by the camera 10. The notification controller 170 may collect a sound output from the terminal device 300 by a vehicle exterior microphone (not illustrated) mounted in the vehicle M, analyze the collected sound, and acquire sound identification information.

Then, the notification controller 170 compares information regarding the acquired image or information of the sound with information notified by the vehicle exterior notification unit 90 (information regarding the vehicle identification) and determines that a user carrying the terminal device 300 is a boarding target user when similarity is equal to or greater than a predetermined value. Thus, it is possible to specify the boarding target user U more reliably than facial recognition or gesture recognition.

In the above-described embodiment, the return process in the autonomous parking event has been mainly described, but the present invention is not limited thereto. For example, the present invention can also be applied to automated driving control at the time of pickup without being limited to a return.

[Hardware Configuration]

Figure 11:
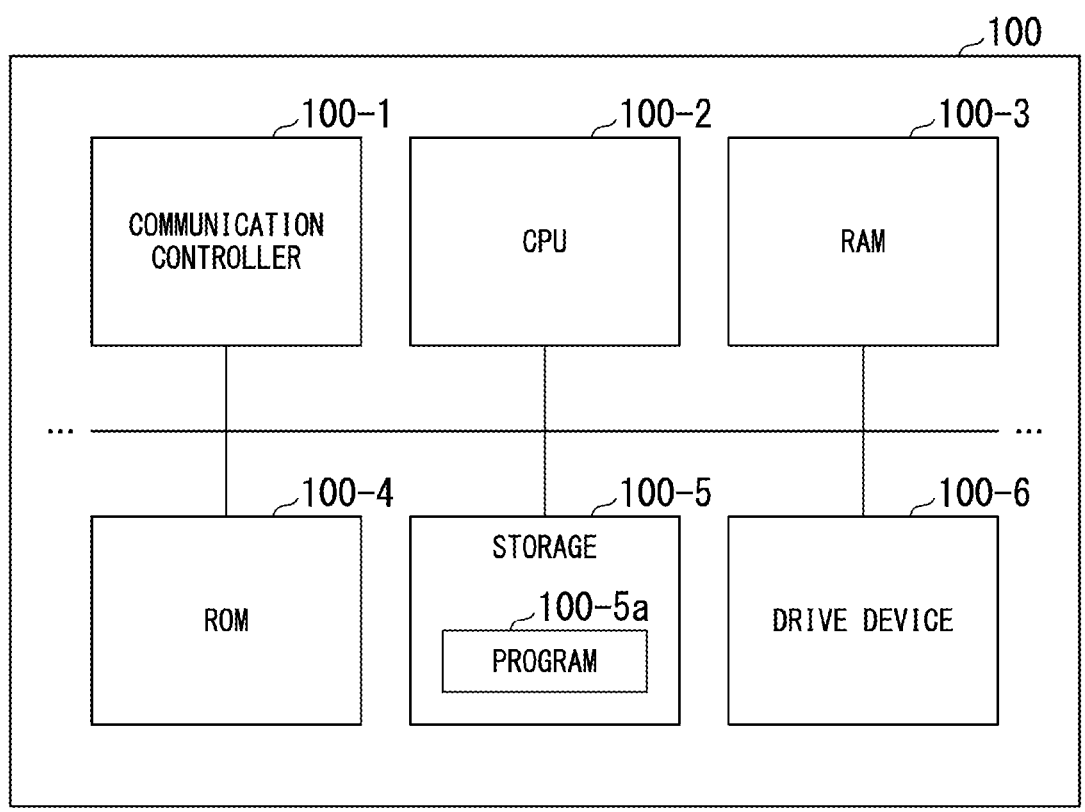
FIG. 11 is a diagram illustrating an example of a hardware configuration of an automated driving control device according to an embodiment.

FIG. 11 is a diagram illustrating an example of a hardware configuration of the automated driving control device 100 according to an embodiment. As illustrated, a computer of the automatic driving control device 100 is configured such that a communication controller 100-1, a CPU 100-2, a random access memory (RAM) 100-3 that is used as a working memory, a ROM 100-4 that stores a boot program or the like, a storage 100-5 such as a flash memory or a HDD, a drive device 100-6, and the like are connected to each other via an internal bus or a dedicated communication line. The communication controller 100-1 performs communication with constituent element other than the automatic driving control device 100. The storage 100-5 stores a program 100-5a that is executed by the CPU 100-2. The program is loaded on the RAM 100-3 by a direct memory access (DMA) controller (not illustrated) to be executed by the CPU 100-2. Thus, some or all of the constituent elements of the automated driving control device 100 are realized.

The above-described embodiment can be expressed as follows:

a vehicle control device including a storage that stores a program and a hardware processor, the vehicle control device causing the hardware processor to execute the program stored in the storage, to recognize a surrounding environment of the vehicle;

to perform speed control and steering control of the vehicle based on a recognition result; and to cause a communication unit to transmit information for notifying information regarding vehicle identification to a terminal device and cause a vehicle exterior notification unit to notify the information regarding the vehicle identification to the outside of the vehicle when the vehicle is caused to travel toward a position at which the user is located.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer configured to recognize a surrounding environment of a vehicle;
a driving controller configured to perform speed control and steering control of the vehicle based on a recognition result of the recognizer;
a communication unit configured to communicate with a terminal device of a user boarding the vehicle;
a vehicle exterior notification unit configured to notify information regarding vehicle identification to the vehicle exterior; and
a notification controller configured to cause the communication unit to transmit information for notifying the information regarding the vehicle identification to the terminal device and to cause the vehicle exterior notification unit to notify the information regarding the vehicle identification when the driving controller causes the vehicle to travel toward a position at which the user is located, wherein the notification controller is further configured to:
cause the communication unit to transmit the information for notifying the information regarding the vehicle identification to the terminal device, and
cause the vehicle exterior notification unit to notify the information regarding the vehicle identification, when a distance between the terminal device and the vehicle or a distance between a boarding area in which the user boards the vehicle to the vehicle, is within a predetermined distance.

2. The vehicle control device according to claim 1, wherein the notification controller is further configured to associate content or a mode of the information regarding the vehicle identification notified by the terminal device, with content or the mode of the information regarding the vehicle identification notified by the vehicle exterior notification unit.

3. The vehicle control device according to claim 1, wherein the notification controller is further configured to synchronize a timing at which the information regarding the vehicle identification is notified by the terminal device with the timing at which the information regarding the vehicle identification is notified by the vehicle exterior notification unit.

4. The vehicle control device according to claim 1, wherein the notification controller is further configured to:
cause the vehicle exterior notification unit to output one or both of an image and a sound associated with the information regarding the vehicle identification, and
cause the communication unit to transmit information for outputting one or both of the image and the sound associated with the information regarding the vehicle identification to the terminal device.

5. The vehicle control device according to claim 1, wherein the notification controller is further configured to:
cause the communication unit to transmit the information for notifying the information regarding the vehicle identification to the terminal device, and
cause the vehicle exterior notification unit to notify the information regarding the vehicle identification when the recognizer recognizes the user boarding the vehicle.

6. The vehicle control device according to claim 1, further comprising:
a reception unit configured to receive setting of a notification mode associated with the information regarding the vehicle identification.

7. The vehicle control device according to claim 6, wherein the notification mode includes at least one of a type of image, an image display mode, a type of sound, and a sound output mode.

8. The vehicle control device according to claim 1, wherein the driving controller causes the vehicle to stop at a position associated with the boarding area when the user is located in the boarding area in which the user boards the vehicle, and the driving controller causes the vehicle to travel slowly when the user is not located in the boarding area.

9. A vehicle control system including:
a vehicle control device configured to control a vehicle; and
a terminal device configured to communicate with the vehicle, wherein the vehicle control device includes:
a recognizer that recognizes a surrounding environment of the vehicle,
a driving controller that performs speed control and steering control of the vehicle based on a recognition result of the recognizer,
a vehicle-side communication unit that communicates with a terminal device of a user boarding the vehicle,
a vehicle exterior notification unit that notifies information regarding vehicle identification to the vehicle exterior, and
a notification controller that causes the vehicle-side communication unit to transmit information for notifying the information regarding the vehicle identification to the terminal device and causes the vehicle exterior notification unit to notify the information regarding the vehicle identification when the driving controller causes the vehicle to travel toward a position at which the user is located, and
wherein the terminal device includes:
a terminal-side communication unit that communicates with the vehicle control device, and
a notification unit that notifies the information regarding the vehicle identification received by the terminal-side communication unit, wherein the notification controller is further configured to:
cause the vehicle-side communication unit to transmit the information for notifying the information regarding the vehicle identification to the terminal device, and
cause the vehicle exterior notification unit to notify the information regarding the vehicle identification, when a distance between the terminal device and the vehicle or a distance between a boarding area in which the user boards the vehicle to the vehicle, is within a predetermined distance.

10. A vehicle control method causing a computer to:
recognize a surrounding environment of a vehicle;
perform speed control and steering control of the vehicle based on a recognition result; and
cause a communication unit to:
transmit information for notifying information regarding vehicle identification to a terminal device, and
cause a vehicle exterior notification unit to notify the information regarding the vehicle identification to the outside of the vehicle when:
the vehicle is caused to travel toward a position at which a user is located, and
a distance between the terminal device and the vehicle or a distance between a boarding area in which the user boards the vehicle to the vehicle, is within a predetermined distance.

11. A computer-readable non-transitory storage medium that stores a program causing a computer to:
- recognize a surrounding environment of a vehicle;
- perform speed control and steering control of the vehicle based on a recognition result; and
- cause a communication unit to transmit information for notifying information regarding vehicle identification to a terminal device and cause a vehicle exterior notification unit to notify the information regarding the vehicle identification to the outside of the vehicle when a process of causing the vehicle to travel toward a position at which a user is located is performed, wherein the notification controller is further configured to:
  - cause the communication unit to transmit the information for notifying the information regarding the vehicle identification to the terminal device, and
  - cause the vehicle exterior notification unit to notify the information regarding the vehicle identification, when a distance between the terminal device and the vehicle or a distance between a boarding area in which the user boards the vehicle to the vehicle, is within a predetermined distance.

* * * * *